(12) United States Patent
Kawai et al.

(10) Patent No.: US 6,506,005 B2
(45) Date of Patent: Jan. 14, 2003

(54) METHOD OF MACHINING SEATS OF COMPRESSOR PISTON

(75) Inventors: Katsunori Kawai, Kariya (JP); Wataru Mase, Kariya (JP); Tomotaka Sawa, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 136 days.

(21) Appl. No.: 09/793,457

(22) Filed: Feb. 26, 2001

(65) Prior Publication Data
US 2001/0022122 A1 Sep. 20, 2001

(30) Foreign Application Priority Data
Mar. 17, 2000 (JP) ........................................ 2000-075877

(51) Int. Cl.$^7$ .............................. B23C 9/00; B23C 1/14; B23B 3/00
(52) U.S. Cl. ........................ 409/131; 409/132; 409/165; 82/1.11
(58) Field of Search ............................ 82/1.11, 2, 3, 4, 82/5, 117, 118, 121; 409/131, 132, 165, 143, 199, 200; 29/898.048, 888.04; 451/51

(56) References Cited

U.S. PATENT DOCUMENTS 6,053,081 A  4/2000  Kimura et al. ................ 82/1.11

FOREIGN PATENT DOCUMENTS

| JP | A-5-149246 | 6/1993 |
| JP | A-6-249140 | 9/1994 |

Primary Examiner—A. L. Wellington
Assistant Examiner—Dana Ross
(74) Attorney, Agent, or Firm—Woodcock Washburn LLP

(57) ABSTRACT

A method of machining seats of a compressor piston having an approximately hemispherical recess. A surface of a piston extending perpendicular to an axis of the piston is machined by annularly moving a cutting element while the cutting element is rotated with respect to the piston to form an annularly cut portion. The surface is further machined by moving the same cutting element in a direction toward the surface while the cutting element and the piston are relatively rotated to form a hemispherical recess in the surface. The firstly formed annularly cut portion becomes an annular chamfered portion on the periphery of the hemispherical recess. In this way, it is possible to form the hemispherical recess, and the annular chamfered portion on the periphery thereof, with the common cutting tool.

17 Claims, 8 Drawing Sheets

METHOD OF MACHINING SEATS OF COMPRESSOR PISTON

BACKGROUND OF THE INVENTION

1. Field of the Invention

The present invention relates to a method of machining the seats of a compressor piston used for a compressor of an air conditioning system (air conditioner) or the like.

2. Description of the Related Art

Control of the temperature, humidity, air flow and air purity in a vehicle passenger compartment, by an air conditioner, is necessary to provide a comfortable environment. The temperature control, etc. by the air conditioner is carried out mainly in such a manner that the compressor in a refrigerator (or a heat pump) circulates the working fluid and performs a refrigeration cycle (or a heat pump cycle).

Figure 9:
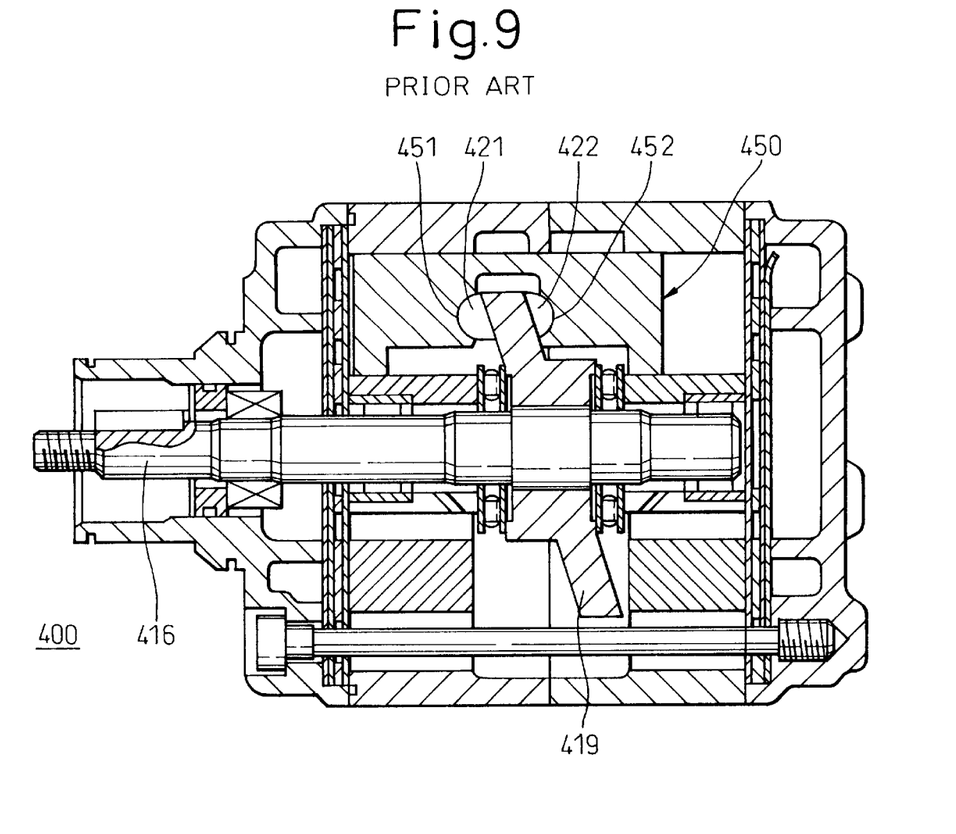
FIG. 9 is a view showing a conventional swash plate type compressor.

Such a compressor is, for example, a swash plate type compressor 400, as shown in FIG. 9 (Japanese Unexamined Patent Publication No. 16-249140). The swash plate type compressor 400 is such that when a main drive shaft 416 is rotated by receiving power from a drive source, a swash plate 419 is moved and compressor pistons 450 (hereinafter called as "piston") are reciprocated so that the working fluid (refrigerant gas) is sucked, compressed and discharged. In the swash plate type compressor 400, hemispherical shoes 421 and 422 are interposed between the swash plate 419 and the seats 451 and 452 of the piston 450, so that the rotation and motion of the swash plate 419 is converted into the reciprocal motion of the pistons 450. The piston 450 includes hemispherical seats 451 and 452 having hemispherical recesses covering at least a portion of the hemispherical portions of the hemispherical shoes 421 and 422.

Figure 8:
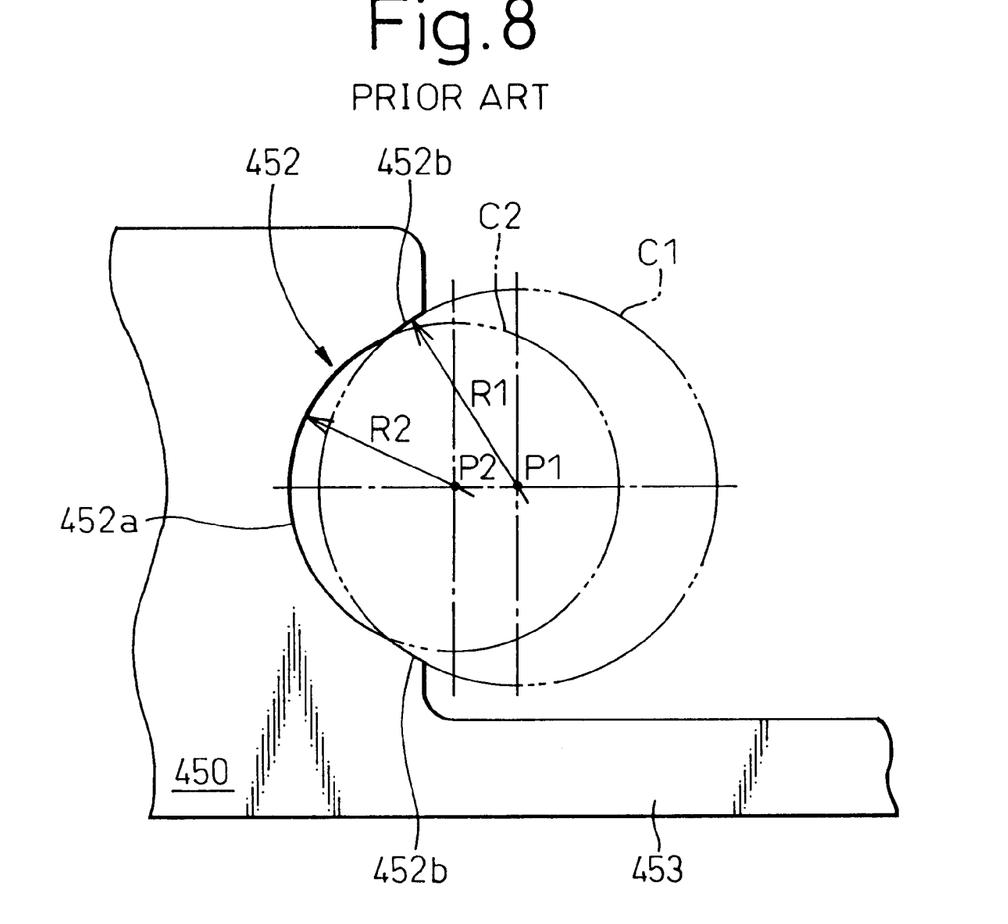
FIG. 8 is a view showing a conventional method of machining seats of a compressor piston.

Incidentally, a method of machining the seats as described above is disclosed in the aforementioned Japanese Unexamined Patent Publication (Kokai) No. 6-249140 and Japanese Unexamined Patent Publication (Kokai) No. 10-220354. Also, though not disclosed in these publications, the periphery of the hemispherical recess has conventionally been chamfered. This chamfering has been carried out with a cutting tool having a large working diameter different from the cutting tool used for machining the hemispherical recess. This process is shown in FIG. 8 taking as an example the case in which the seat 452 of the piston 450 of the swash plate type compressor 400 is machined. According to this machining method, first, a cutting tool C1 having the working diameter R1 is rotated while being moved until the center of the cutting element thereof reaches the point P1 thereby to form a chamfered portion 452b. Next, the tool C1 is removed and a cutting tool C2 having the working diameter R2 (R2<R1) is moved until the center of the cutting element thereof reaches the point P2 thereby to form a hemispherical recess 452a.

Since the chamfered portion and the recess of the seat are conventionally machined with different tools C1 and C2, loading and unloading of the workpiece (the piston or the stock thereof), mounting and demounting the workpiece and change or relocation of the tool consume extra time, thereby making it difficult to improve the machining efficiency of the seats and hence the production efficiency of the piston, although the situation may vary depending on the machining process and the machining equipment.

Also, mounting and demounting the work and changing of the tool makes it impossible to machine the chamfered portion and the recess under exactly the same conditions, and therefore, the machining precision of the depth of the spherical surface of the recess, for example, cannot be improved.

Further, in the case where the space in the work into which the tool is to be inserted is small, a large tool for machining the chamfered portion may not be inserted. Further, the provision of a specially relieved portion for inserting the tool to avoid this inconvenience undesirably limits the design latitude of the piston and the compressor.

Furthermore, a large working diameter of the tool reduces the degree of machining freedom, thereby sometimes making it difficult to adjust the chamferring angle and the chamfer width.

SUMMARY OF THE INVENTION

The present invention is made under these circumstances, and the object of the present invention is to provide a method of machining seats of a compressor piston by which a hemispherical recess and a chamfered portion on the periphery of the recess can be efficiently machined.

The inventors of the present invention have made vigorous research effort to solve the aforementioned problems and, by trial and error, reached the idea of machining and forming the recess and the chamfered portion of the seat of the compressor piston using the same tool, and developed a method of machining seats of the compressor piston according to the present invention.

Specifically, according to the present invention, there is provided a method of machining seats of a compressor piston, the seat having an approximately hemispherical recess adapted for sliding engagement with a hemispherical shoe of a compressor. The method comprises the steps of: annularly moving a cutting element along a surface of a piston while at least one of the cutting element and the piston is rotated with respect to the other to form an annularly chamfered portion in the surface; and moving the cutting element in direction toward the surface while the at least one of the cutting element and the piston is rotated with respect to the other to form a hemispherical recess in the surface.

In this method, the chamferring step and the recess forming step are carried out with the same cutting element and, therefore, the transfer of steps from the chamferring step to the recess forming step and from the recess forming step to the chamferring step can be smoothly carried out, thereby making it possible to reduce or eliminate the time required for loading and unloading the workpiece, mounting and demounting the workpiece and changing or relocating the tool. As a result, the efficiency of machining the seats of the compressor piston can be improved.

Also, since the piston seats are machined using the same cutting element for the chamferring step and the recess forming step without removing the workpiece, a position deviation and an offset of the center are not caused, thereby making it possible to improve the machining accuracy for the chamfered portion and the recess (such as the depth of the spherical surface of the recess).

Preferably, the step of annularly moving the cutting element is carried out prior to the step of moving the cutting element in a direction toward the surface.

By forming the recess after forming the annular cut portion becoming the chamfered portion, burrs are not formed by machining the hemispherical surface of the recess, and foreign matter can be prevented from entering in a gap between the recess and the shoe.

Preferably, the compressor piston comprises a piston of a swash plate type compressor and includes a hollow or solid cylindrical head portion, a neck portion extending from one side of the head portion, and two seats on the neck portion in opposed relation to each other and having approximately hemispherical recesses, the neck portion and the two seats constituting an approximately U-shaped space so that a swash plate can be arranged in the U-shaped space and shoes can be interposed between the swash plate and the seats to thereby enable the motion of the swash plate to produce a reciprocating motion of the compressor piston.

In this machining method, the chamferring step is carried out by moving the same cutting element as in the recess forming step along the annular path, and therefore as long as the recess forming step can be carried out by inserting the cutting tool carrying the cutting element in to a substantially U-shaped space, it is also possible to carry out the chamferring step in other words, even in the case where the two seats are oppositely arranged to form a substantially U-shaped space, the chamferring step can be carried out without interference between the cutting tool and the seats. As a result, the need of providing a special space for carrying out the chamferring step in the compressor piston is eliminated, thereby improving the freedom of designing the compressor piston.

Also, in view of the fact that the recesses of the two seats are arranged in an opposed relation to each other, the recesses and the chamfered portions of the two seats can be formed in a single step by machining the seats while rotating the compressor piston relative to the tool, thereby further improving the machining efficiency.

Preferably, the chamfered portion includes a first portion having a first chamfer width and a second portion having a second chamfer width different from the first chamfer width.

In the chamferring, a cutting tool with a large working diameter need not be used unlike in the prior art. Therefore, the width, the angle, the position, etc. of the chamfered portion can be easily controlled. For example, the chamfered portion is formed conveniently with a wide width portion and a narrow width portion.

By the way, the surface pressure acting on the recess of the seat can be controlled by the wide width portion and the narrow width portion. For example, the narrow width portion is formed in the area subjected to a large load so that the contact area between the shoes, and the recess is increased, thereby making it possible to reduce the surface pressure acting on them.

Thus, the narrow width portion is desirably formed in the area of the seat recess subjected to a large load (receiving a large surface pressure) in the compression stroke, while the wide width portion is desirably formed conversely in the area where the surface pressure between the seat and the shoe is small.

Also, the area formed with the wide width portion has a large gap between the shoe and the chamfered portion, with the result that the lubricant is increasingly guided and introduced into the particular portion for an improved slidability between the recess and the shoe.

Incidentally, the cutting tool may be a ball end mill or a cutting tool having a substantially spherical cutting element at the forward end thereof, or a cutting tool with a semicircular disk-shaped chip attached to the forward end of a shank. The cutting element may be a cutting edge or a grinding element. The machining work performed in the recess forming step and the chamferring step may be carried out either by rotating the cutting tool or by rotating the compressor piston. The two parts may be rotated relatively to each other. Similarly, the two parts may be moved relatively to each other along an annular path even in the case where the tool is moved along the annular path.

The machining method according to the present invention is applicable widely to the compressor piston including seats each having a substantially hemispherical recess and a chamfered portion on the periphery thereof as well as to the piston of a swash plate type compressor. The piston may be either single headed or double headed piston. Also, the compressor using the piston may be of either a variable displacement type or a constant displacement type. Further, the present invention is applicable to both the refrigeration cycle and the heat pump cycle. Furthermore, the present invention is applicable to a general type compressor as well as a vehicle air conditioner compressor.

The other objects and features will be understood from the following description of the preferred embodiments of the present invention.

BRIEF DESCRIPTION OF THE DRAWINGS

The present invention will become more apparent from the following description of the preferred embodiments, with reference to the accompanying drawings in which.

DESCRIPTION OF THE PREFERRED EMBODIMENTS

The first embodiment of the present invention will now be explained with reference to FIGS. 1A to 3. A compressor piston (hereinafter simply referred to as "piston") 50 shown in FIGS. 1A to 3 has a basic configuration similar to that of a double-headed piston 450 for a swash plate compressor shown in FIG. 9, and has a shape of a solid cylindrical member with a portion thereof cut out, as shown in FIG. 3. Specifically, the piston 50 includes cylindrical head portions 54, seats 51 and 52 and a neck portion 53. The seat 51, the neck portion 53 and the seat 52 are arranged in this order viewed from one of the head portions 54 (the right one in FIGS. 1A and 3). The seats 51 and 52 are connected to each other by the neck portion 53. The seats 51 and 52 are arranged in surfaces 51S and 52S substantially perpendicular to the neck portion 53 and comprise recesses formed in the surfaces 51S and 52S in opposed relation to each other. Thus, a substantially U-shaped space K is formed by the seats 51 and 52 and the neck portion 53.

Figure 7:
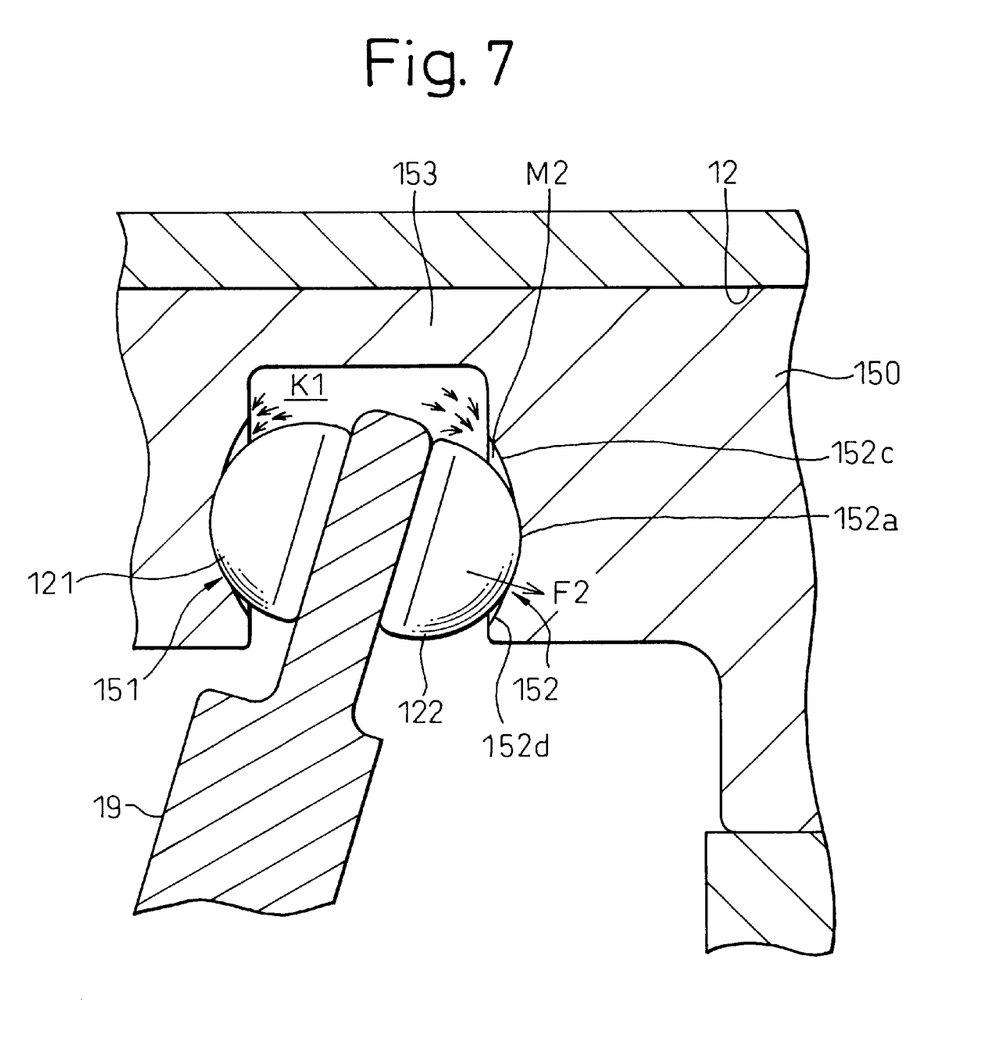
FIG. 7 is a partly enlarged view of the compressor piston of the second embodiment of the present invention mounted on a swash plate type compressor.

A swash plate 19 is arranged in the space K, with shoes 121 and 122 interposed between the swash plate 19 and the seats 51 and 52, as shown in FIG. 7. The swinging motion of the swash plate 19 causes the reciprocal motion of the piston 50 (150) in the cylinder bore 12 (FIG. 7).

Figure 1A:
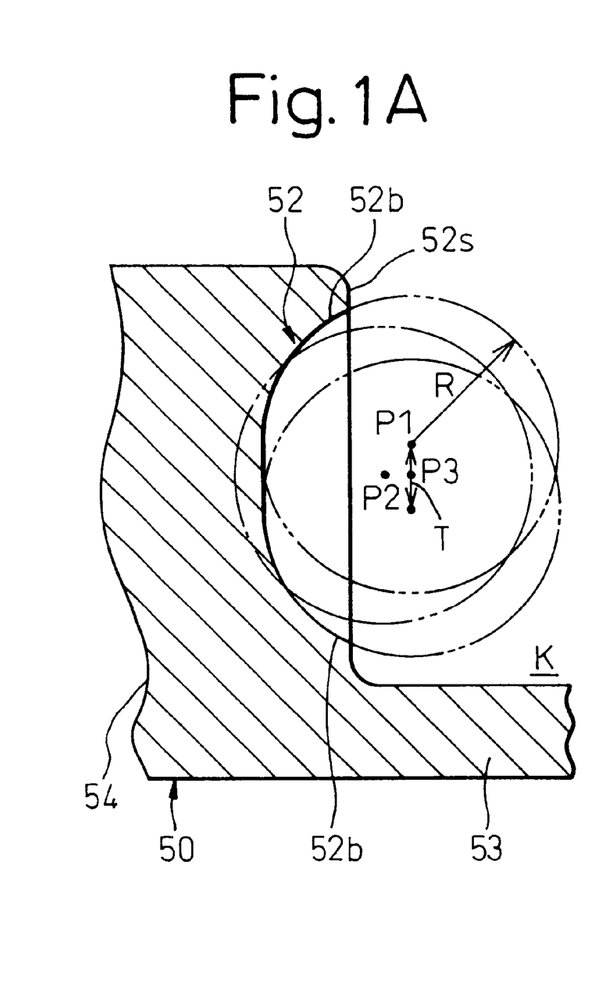
FIG. 1A is a sectional view showing a chamferring step of a method of machining seats of a compressor piston according to the first embodiment of the present invention.
Figure 1B:
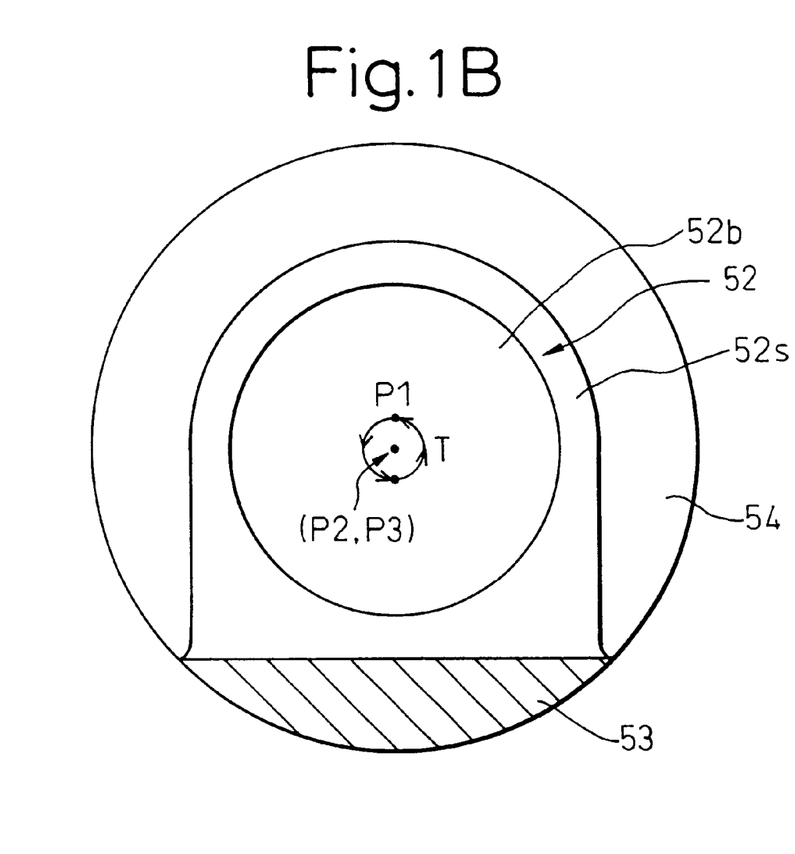
FIG. 1B is a front view of the seat shown in FIG. 1A.
Figure 2A:
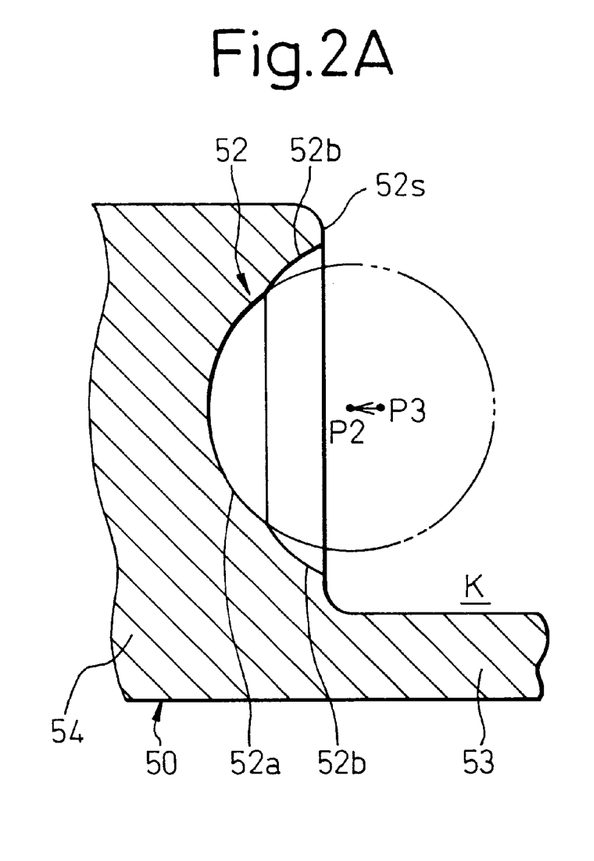
FIG. 2A is a sectional view showing a recess forming step of the method of machining seats of the compressor piston, following the step of FIGS. 1A and 1B.
Figure 2B:
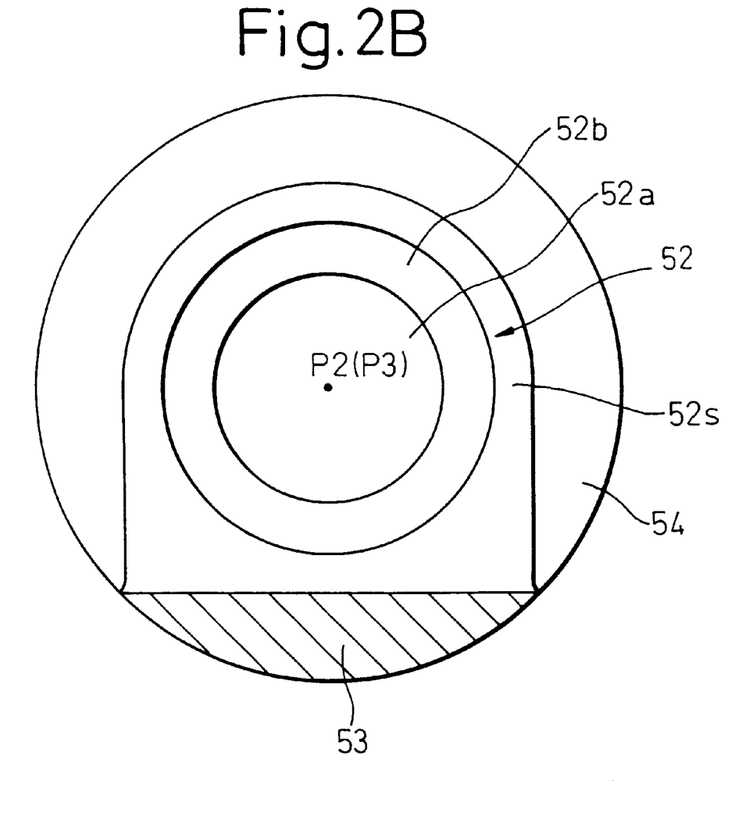
FIG. 2B is a front view of the seat shown in FIG. 2A.
Figure 3:
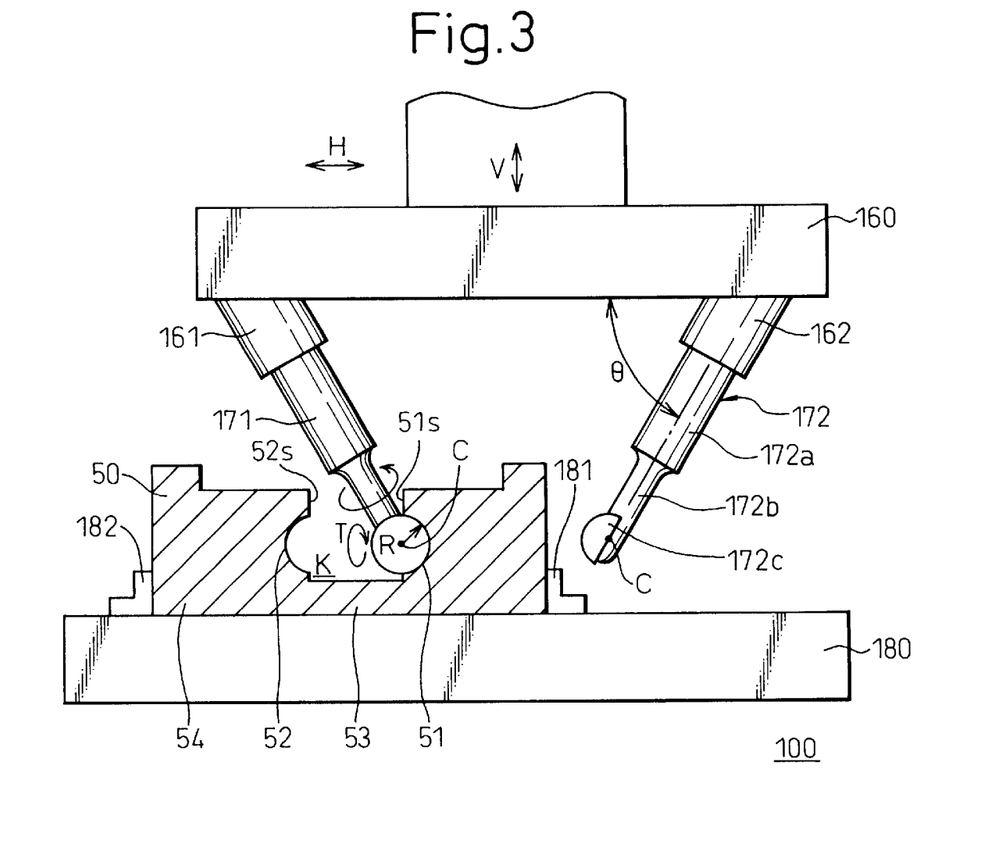
FIG. 3 is a view schematically showing a seat machining unit used in the first embodiment of the present invention.

FIG. 1A and FIG. 2A are sectional views showing a portion of the piston 50 including the head portion 54, and FIG. 1B and FIG. 2B are front views of the seats 52 thereof. In FIGS. 1A to 2B, the portion of the piston 50 including one seat 52 is shown in an enlarged form to explain the chamferring step and the recess forming step. This relation is also the same for FIG. 4A and FIG. 4B described later.

The chamferring step in the method of machining the seats 51 and 52 will be explained first with reference to FIGS. 1A, 1B and 3. The seat 51 is machined with a cutting tool 171, while the seat 52 is machined with a cutting tool 172, as shown in,FIG. 3. The cutting tool 171 and 172 have cutting chips 172c at the distal ends thereof. The following explanation is mainly directed to the machining of the seat 52, but it will be apparent that the same principle is applied to the seat 51.

As shown in FIGS. 1A and 1B, the center C of the cutting element of the cutting tool 172 (which is the center of revolution of the chip 172c shown in FIG. 3) is moved to any position P1 in annular centrode T (a top position of the centrode T shown in FIG. 1B in this case), and the cutting tool 172 is rotated, so that an annular cut portion 52b (becoming a chamfered portion 52b) begins to be formed. The center C of the cutting element is then caused to move one turn along the centrode T, so that the circular or annular cut portion or groove 52b including the annular chamfered portion 52b is formed in surface 52S of the seat 52.

The recess forming step will now be explained with reference to FIGS. 2A and 2B. After the chamferring step, the center C of the cutting element is moved to a position P3 at the center of the centrode T, while the cutting tool 172 is rotated in the same position. Then, the center C of the cutting element is moved to a position P2 in the direction perpendicular to the direction of movement in which the center C is moved to the position P3, with the result that a recess 52a is formed. At the same time that the recess 52a is formed, an annular chamfer 52b is formed along the periphery of the recess 52a.

A seat machining unit 100 used for machining the seats of the piston will be explained with reference to FIG. 3. The seat machining unit 100 includes cutting tools 171 and 172 arranged in an inclined position at a predetermined angle θ and in a reversely inclined position at the same angle θ, as described above. These cutting tools 171 and 172 are mounted on arms 161, 162, respectively. The arms 161 and 162 are adapted to rotate the cutting tools 171 and 172 around their axes thereof, respectively, and at the same time, they can move the centers C of the cutting elements along the annular centrode T. This annular motion can be elliptical as well as circular by numerical control.

The arms 161 and 162 are mounted on a head 160, which can be moved in the vertical and horizontal directions. Also, the piston 50 constituting the workpiece is fixed by fixing means 181 and 182 to a table 180. This seat machining unit 100 is capable of carrying out the chamferring step and the recess forming step without mounting/demounting the workpiece, and therefore can improve the seat machining accuracy.

Further, the cutting tool 172 (also the cutting tool 171) includes a shank with a large diameter shank portion 172a, a small diameter shank portion 172b extending toward the distal end from the large diameter shank portion 172a and a semicircular disk shaped cutting chip 172c mounted at the forward end of the small-diameter shank portion 172b.

Now, the motion of the seat machining unit 100 will be explained briefly. The seat machining unit 100 moves the head 160 appropriately in the horizontal direction H and in the vertical direction V, to allow the cutting chip 172c and the small diameter shank portion 172b of the cutting tool 172 to be inserted into the substantially U-shaped space K, while holding the cutting tool 172 at an inclination angle θ to the table 180. According to the program preset in a controller (not shown), the arm 162 causes the cutting tool 172 to perform the motion shown in FIGS. 1A to 2B described above. Specifically, while maintaining the inclination angle θ, the cutting tool 172 is caused to perform the annular motion (contouring) along the centrode T (chamfer forming step), and the center C of the cutting element of the cutting tool 172 is moved from the position P3 to the position P2 (recess forming step).

After that, the center C of the cutting element of the cutting tool 172 is moved from the position P2 to the position P3, whereby the cutting tool 172 is removed. In this way, the machining of the seat 52 is completed. By machining the seat 51 using the cutting tool 171 in a similar fashion, the machining of the seats 51 and 52 of the piston of the swash plate type compressor is completed.

By the way, in view of the fact that the cutting tools 171 and 172 include the small diameter shank portions 172b at the forwards end thereof and can machine the seats 51 and 52 while maintaining the inclination angle θ, the recesses 51a and 52a having the spherical surface of a large depth can be formed without interfering with the vertical surfaces 51S and 52S of the seats 51 and 52.

Figure 4A:
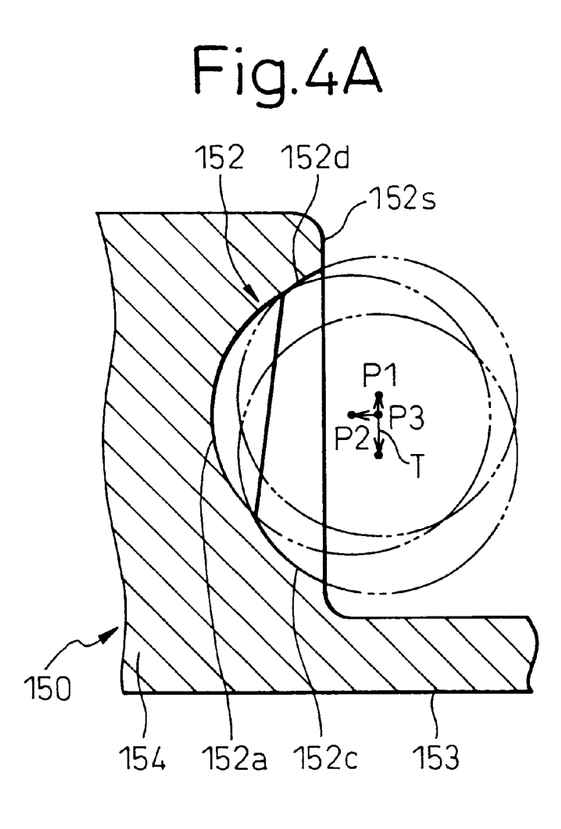
FIG. 4A is a sectional view showing a method of machining seats of a compressor piston according to the second embodiment of the present invention.

The second embodiment of the present invention will now be explained with reference to FIGS. 4A and 4B. The piston 150 shown in FIG. 4A is basically in the same shape as the piston 50 shown in FIGS. 1A to 3, except that the shapes of the recess 152a and the chamfered portion 152b of the seat 152 machined are changed. Of course, the piston 150 has another seat in opposed relation to the seat 152, which is similar to the seat 152.

The chamferring step for the seat 152, like the chamferring step for the seat 52, is executed using the cutting tool 172, by moving the center C of the cutting element thereof along the annular centrode T. As compared with the first embodiment, however, the position of the centrode T is displaced slightly toward the neck portion 153 (downward in FIGS. 4A and 4B).

Figure 4B:
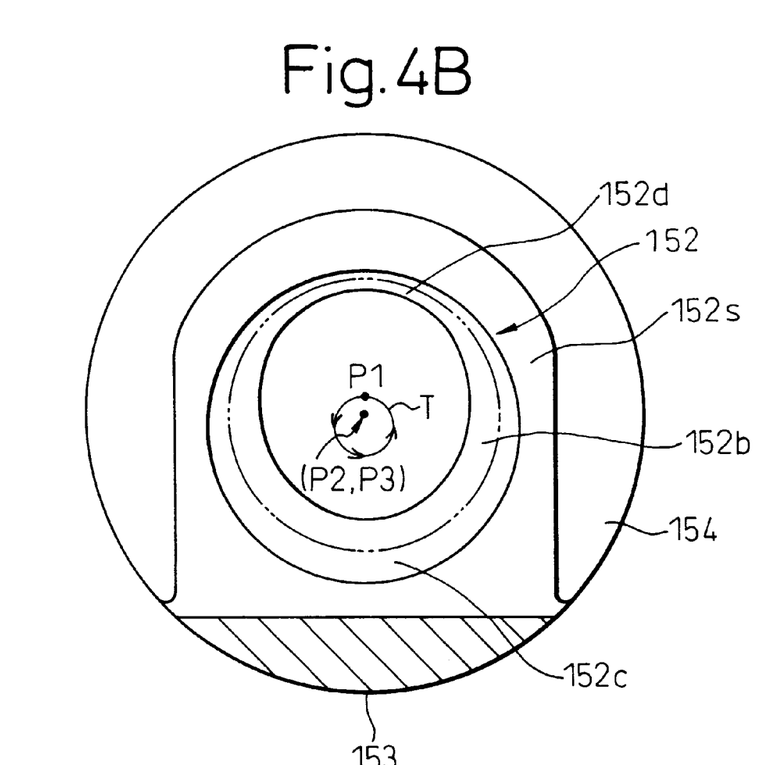
FIG. 4B is a front view of the seat shown in FIG. 4A.

The next recess forming step is executed by moving the center C of the cutting element to the position P3, slightly displaced upward in FIGS. 4A and 4B from the central position of the centrode T of the completion of the chamferring step, and further to the position P2. As a result, the recess 152a and the annular chamfered portion 152b on the periphery thereof are formed. The position P3 remains at the same position as in the first embodiment.

In view of the fact that the center C of the centrode T is slightly displaced toward the neck portion 153 (downward in FIGS. 4A and 4B) from the starting position P3 of the recess forming step, the chamfered width of the chamfered portion 152b formed along the periphery of the recess 152a is not uniform but changes continuously. Thus, a wide width portion 152c and a narrow width portion 152d are formed in a lower part and in an upper part, respectively, of FIGS. 4A and 4B. The shape and position of the wide width portion 152c and the narrow width portion 152d can be freely set by adjusting the centrode T and the positions P2 and P3. According to this embodiment, the machining position for the chamfer forming step is changed. As an alternative, however, the machining position for the recess forming step may be changed.

Figure 5:
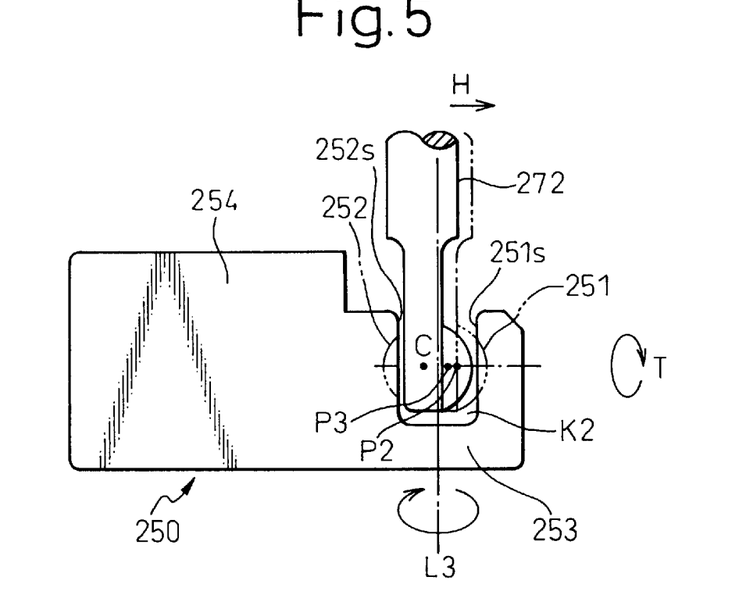
FIG. 5 is a view showing the third embodiment of the present invention.

The third embodiment of the present invention will now be explained with reference to FIG. 5. The piston 250 shown in FIG. 5 is a single headed piston having a head for a variable displacement swash plate type compressor, as an example, in which the U-shaped space K2 formed by the neck portion 253 and the seats 251 and 252 is smaller than the area occupied by the piston 50. In such a case, a cutting tool 272 having substantially the same shape as the cutting tool 172 is inserted substantially in parallel with the seats 251 and 252. The piston 250 is rotated about an axis L3 of defined intermediately between the seats 251 and 252, and the cutting tool 272 is moved very slightly in the horizontal direction H and the center C of the dutting element is annularly moved along the centrode Tu As a result, the chamfered portion of the seats 251 and 252 is formed at one time. Also, the recess of the seats 251 and 252 is formed at one time by returning the center C of the cutting element to the center position P3 of the centrode T and moving the cutting element of the cutting tool 272 further therefrom and to the position P2 in the horizontal direction H as indicated by arrow.

The use of this machining method can conveniently machine the chamfered portions and the recesses of the seats 251 and 252 each in one step with a high accuracy.

Figure 6:
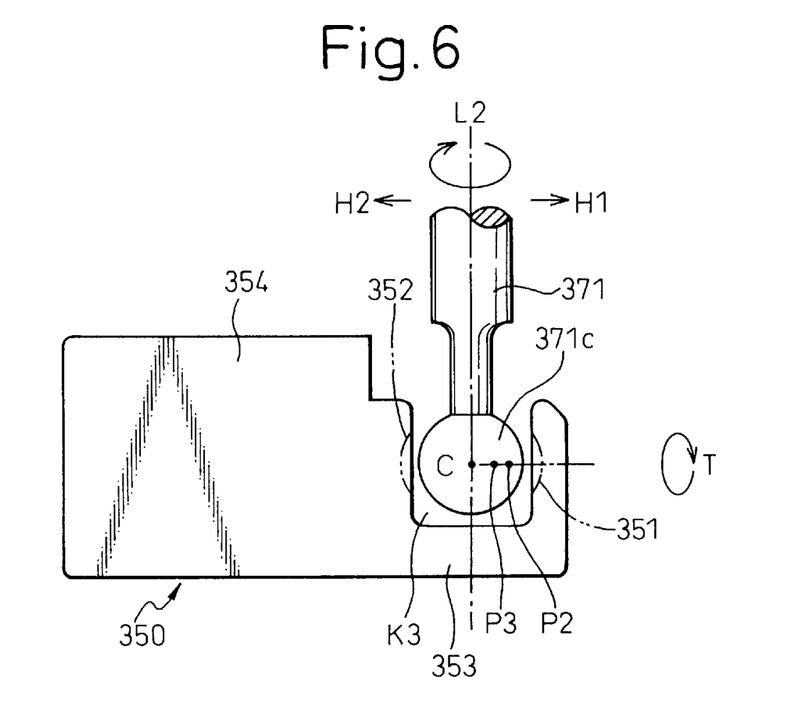
FIG. 6 is a view showing the fourth embodiment of the present invention.

The fourth embodiment of the invention will now be explained with reference to FIG. 6. The piston 350 shown in FIG. 6 is a single headed piston having a head 354 for a constant displacement swash plate type compressor, and as compared with the piston 250 of the variable displacement type compressor shown in FIG. 5, is an example in which the substantially U-shaped space K3 formed by the neck portion 353 and the seats 351 and 352 is somewhat larger than the corresponding space for the piston 250.

In machining this piston 350, a cutting tool 371 having a spherical cutting element 371c is rotated about the axis L2 to machine the chamfered portions and the recesses of the seats 351 and 352.

In the chamferring step for the seat 351, the center of the cutting element 371c of the cutting tool 371, after being slightly moved in the horizontal direction H1 to the position P3, is annularly moved along the centrode T. In the recess forming step for the seat 351, on the other hand, the center C of the cutting element 371c, after being moved provisionally to the center position P3 of the centrode T, is moved to the position P2 in the horizontal direction H1, thereby forming a recess in the seat 351. The seat 352 is also machined in the same manner as the seat 351 by moving the cutting tool 371 in the horizontal direction H2.

Instead of annularly moving the cutting tool in the chamferring step according to the first to fourth embodiments as described above, the piston can be annularly moved.

Next, the piston 150 (FIGS. 4A and 4B) according to the second embodiment described above is fitted in the cylinder bore 12 of the swash plate type compressor, while at the same time the shoes 121 and 122 and the swash plate 19 are inserted in the space K1 formed by the seats 151 and 152 and the neck portion 153, as shown in the partly enlarged view of FIG. 7. FIG. 7 shows the manner in which the piston 150 is pressed by the swash plate 19 in the compression stroke. Under this condition, a large force F2 including a radially inward force component acts on the seat 152 from the shoe 122, and the surface pressure near that portion increases. In view of the fact that the narrow width portion 152d is formed in the chamfered portion 152b of the seat 152, however, the force F2 is received over a relatively wider surface, thereby preventing the surface pressure from becoming excessively greater.

Also, since the wide width portion 152c is formed on the opposite side, an oil pool M2 is formed between the shoe 122 and the seat 152, so that a mist of lubricant can be guided and supplied conveniently into a gap between the shoe 122 and the seat 152. As a result, the slidability between them can be improved, and the wear of the spherical surface of the recess 152a, etc. can be suppressed, while at the same time preventing the sliding parts from sticking. The foregoing explanation has been directed to the seat 152, and the same can be also applied to the seat 151.

The method of machining the seats of the compressor piston according to the present invention can improve both the machining efficiency and the machining accuracy for the recesses and the chamfered portions of the seats.

What is claimed is:

1. A method of machining seats of a compressor piston said seat having an approximately hemispherical recess adapted for sliding engagement with a hemispherical shoe of a compressor, said method comprising the steps of:

annularly moving a cutting element along a surface of a piston while at least one of said cutting element and said piston is rotated with respect to the other to form an annularly chamfered portion in said surface; and moving said cutting element in a direction toward said surface while said at least one of said cutting element and said piston is rotated with respect to the other to form a hemispherical recess, in said surface.

2. The method according to claim 1, wherein the step of annularly moving the cutting element is carried out prior to the step of moving the cutting element in a direction toward said surface.

3. The method according to claim 1, wherein said compressor piston comprises a piston of a swash plate type compressor and includes a hollow or solid cylindrical head portion, a neck portion extending from one side of said head portion, and two seats extending on said neck portion in opposed relation to each other and having approximately hemispherical recesses, said neck portion and said two seats constituting an approximately U-shaped space so that a swash plate can be arranged in said U-shaped space and shoes can be interposed between the swash plate and the seats to thereby enable a motion of said swash plate to be converted a reciprocating motion of said compressor piston.

4. The method according to claim 1, wherein said chamfered portion includes a first portion having a first chamfer width and a second portion having a second chamfer width different from said first chamfer width.

5. The method according to claim 1, wherein said cutting element is moved along an annular path around a first point in the step of annularly moving the cutting element, and said cutting element is moved from said first point to a second point positioned near said surface in the step of moving the cutting element in a direction toward said surface.

6. The method according to claim 5, wherein said cutting element is axially moved from said first point to said second point in the step of moving the cutting element in a direction toward said surface.

7. The method according to claim 5, wherein said first point is a center of said annular path.

8. The method according to claim 5, wherein said first point is offset from a center of said annular path.

9. The method according to claim 5, wherein said annular path comprises a circular path.

10. The method according to claim 1, wherein said cutting element is rotated.

11. The method according to claim 1, wherein said piston is rotated.

12. The method according to claim 1, wherein said cutting element is carried by a cutting tool which is rotatably mounted to a movable head of a seat machining unit.

13. The method according to claim 12, wherein said cutting tool is arranged at an angle to said head.

14. The method according to claim 12, wherein said cutting tool is arranged substantially perpendicular to said head.

15. The method according to claim 12, wherein said cutting tool includes a shank having a first shank portion and a second shank portion having a cross-sectional size smaller than that of said first shank portion, said cutting element beings attached to said second shank portion.

16. The method according to claim 12, wherein said head carries two cutting tools, one of said cutting tool being arranged in an inclined position at an angle to said head, the other of said cutting tool being arranged in a reversely inclined position at an angle identical to said angle of said one cutting tool.

17. The method according to claim 1, wherein said cutting element has such a shape that said cutting element can form at least a portion of a sphere upon relative rotation between said cutting element and said piston.

* * * * *